No. 759,896. Patented May 17, 1904.

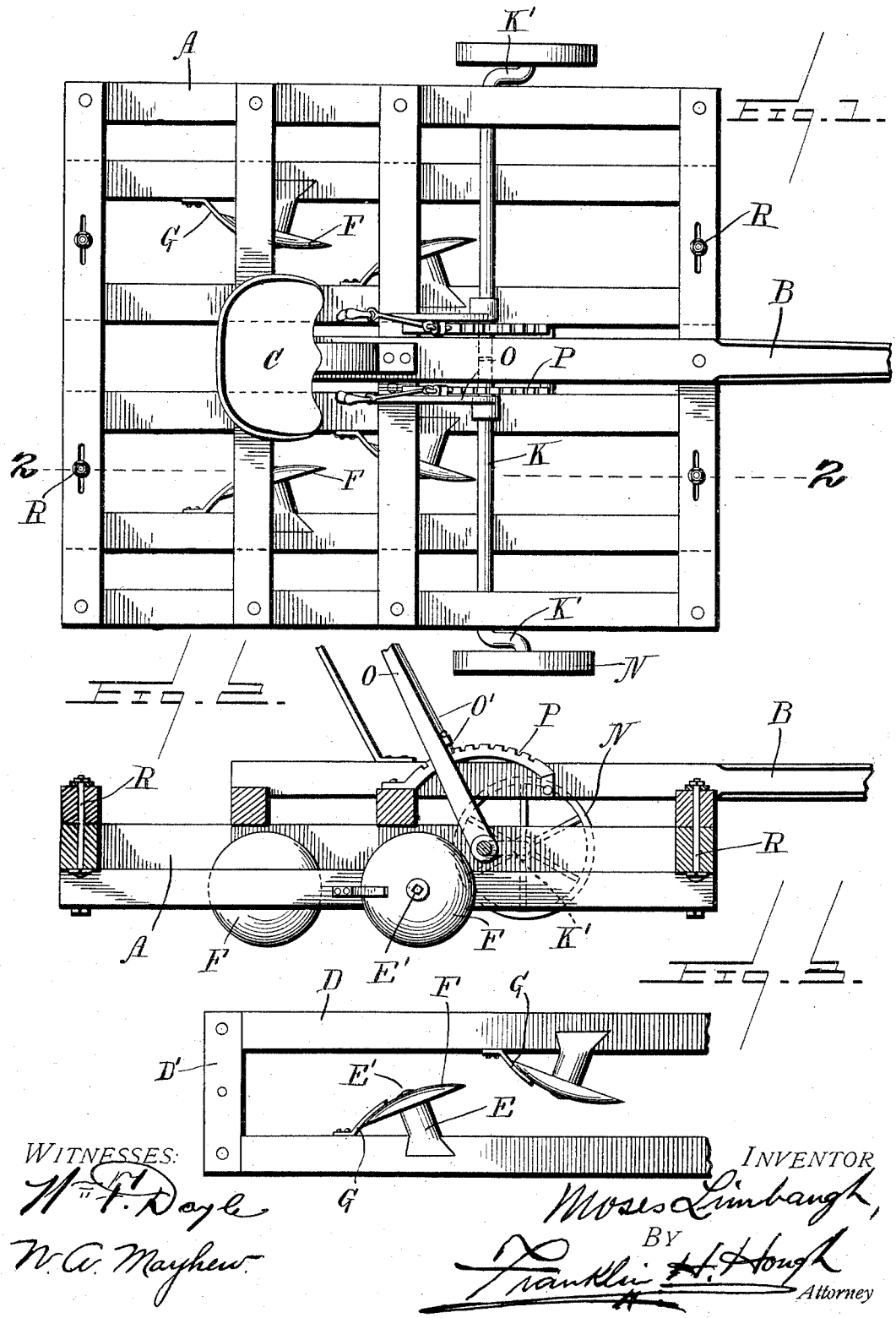

UNITED STATES PATENT OFFICE.

MOSES LIMBAUGH, OF GRAND JUNCTION, COLORADO.

ALFALFA-CREASER.

SPECIFICATION forming part of Letters Patent No. 759,896, dated May 17, 1904.

Application filed December 16, 1903. Serial No. 185,441. (No model.)

*To all whom it may concern:*

Be it known that I, MOSES LIMBAUGH, a citizen of the United States, residing at Grand Junction, in the county of Mesa and State of Colorado, have invented certain new and useful Improvements in Alfalfa-Creasers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in agricultural implements; and it consists in the provision of an alfalfa-creaser adapted for use in furrowing land sown with alfalfa or other seed, and comprises various features of construction and combinations of parts, which will be hereinafter fully described and then specifically defined in the appended claim.

I illustrate my invention in the accompanying drawings, which, with the letters of reference marked thereon, form a part of this application, in which drawings similar letters of reference indicate like parts in the views, in which—

Figure 1 is a top plan view of my invention. Fig. 2 is a sectional view on line 2 2 of Fig. 1. Fig. 3 is a detail view of one of the sections of the framework of the apparatus.

Reference now being had to the details of the drawings by letter, A designates the top portion of the frame of the apparatus, made up of beams bolted together, and B is a tongue secured to said frame, and the seat C is mounted upon the rear end of the tongue. Mounted upon the under side of the frame are two parallel racks D, a portion of one being shown in Fig. 3 of the drawings, each of said racks being made up of two longitudinal sections the ends of which are connected by strips D'. The inner face of each of the longitudinal beams of the racks D is recessed to receive a stub-shaft E, which is preferably dovetailed in said recess, and said stub-shafts are disposed at an inclination to the beam, as illustrated clearly in the drawings. Each stub-shaft carries a pin E', upon which a disk F is pivoted, and fastened to each beam adjacent to the disk is a finger G, which is positioned adjacent to the convexed surface of the disk and provided to clean the latter as the dirt accumulates upon the surface thereof. Each rack has a pair of disks inclined in opposite directions, as shown clearly in the drawings, and spaced apart, adapted to throw the dirt in opposite directions as the apparatus passes through the ground.

Journaled in the longitudinal beams of the frame A are the wheel-shafts K, the outer ends of which are bent to form cranks K', and wheels N are journaled upon the crank ends of said shafts. A lever O is fixed to each shaft K and carries a dog O', which is designed to engage a segment P, which is fastened to the frame.

By the provision of the levers O it will be observed that the shafts K may be turned for the purpose of regulating the depth to which the disks are designed to cut in the ground, and each side may be raised or lowered independently to adapt the machine for uneven ground.

Each of the racks D is held to the frame by means of bolts R (shown in Figs. 1 and 2 of the drawings) and may be easily removed and replaced when desired.

By the provision of an apparatus embodying the features of my invention it will be observed that the ground may be creased in parallel rows by pulling the apparatus over the ground, the disks being disposed, as shown, to throw the dirt in opposite directions, and by means of the lever mechanism the apparatus may be raised and lowered.

While I have shown a particular construction of apparatus embodying the features of my invention, it will be understood that I may make alterations in the detailed construction of the machine without in any way departing from the spirit of the invention.

Having thus described my invention, what I claim as new, and desire to secure by Letters Patent, is—

In combination with a frame provided with a tongue, bolts passing through the transverse end beams of said frame, racks made up of two parallel beams with cross-pieces D' connecting the ends thereof and through which cross-pieces said bolts pass and are adapted to move with said racks, crank-shafts journaled in said frame, wheels mounted upon the crank ends of said shafts, curved segment-bars fastened to cross-pieces upon said frame and to said tongue, levers fitted to the cranks upon said shafts, pawls carried by said levers and designed to engage the teeth of said segments, stub-shafts having dovetailed connections in recesses in the inner faces of the beams of said racks, and disposed at inclinations to said beams, pins carried by said stub-shafts, and colters pivotally mounted upon said pins, as set forth.

In testimony whereof I hereunto affix my signature in presence of two witnesses.

MOSES LIMBAUGH.

Witnesses:
WM. E. DUDLEY,
W. H. SOUTH.